C. E. KING.
DRAFT EQUALIZER FOR CULTIVATORS.
APPLICATION FILED NOV. 9, 1911.
1,028,076.
Patented May 28, 1912.
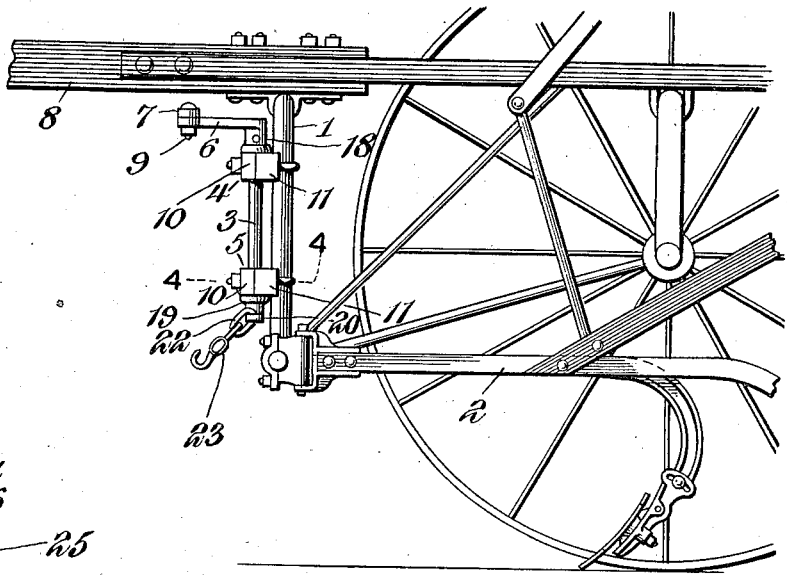
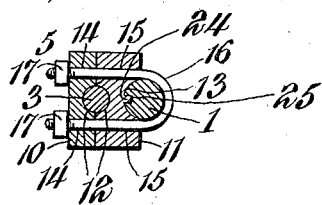
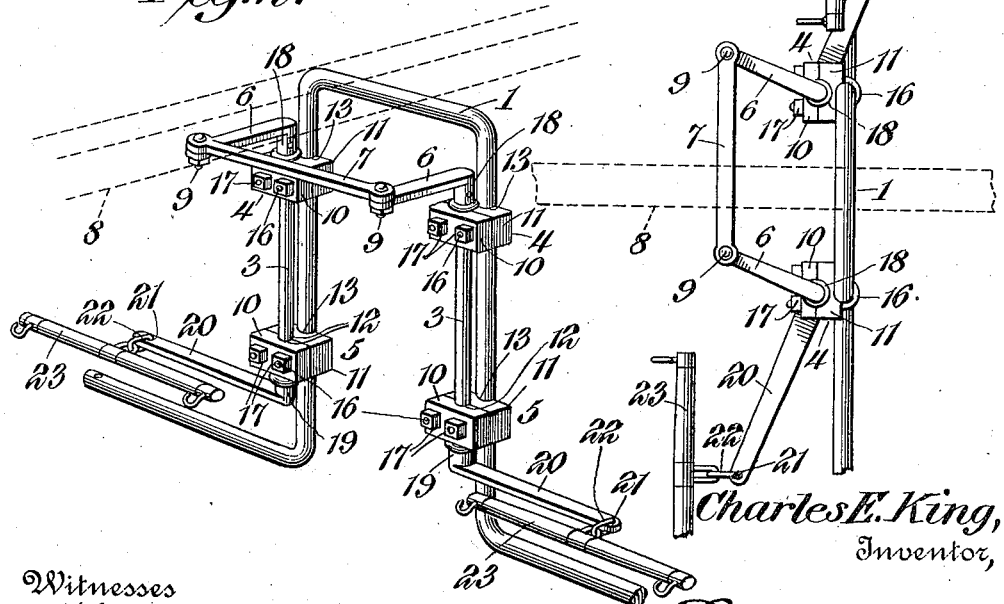
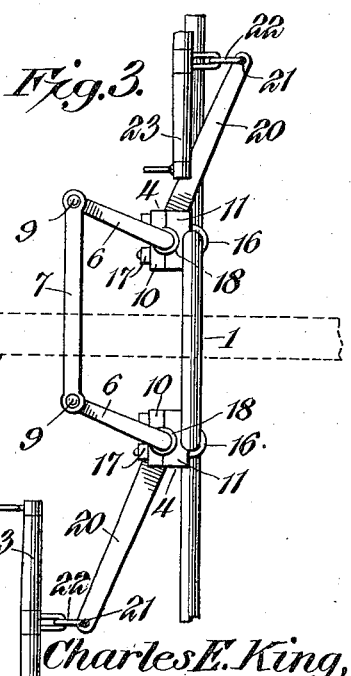
Charles E. King,
Inventor,

UNITED STATES PATENT OFFICE.

CHARLES E. KING, OF GRAY, IOWA.

DRAFT-EQUALIZER FOR CULTIVATORS.

1,028,076.

Specification of Letters Patent.

Patented May 28, 1912.

Application filed November 9, 1911. Serial No. 659,363.

*To all whom it may concern:*

Be it known that I, CHARLES E. KING, a citizen of the United States, residing at Gray, in the county of Audubon and State of Iowa, have invented a new and useful Draft-Equalizer for Cultivators, of which the following is a specification.

The invention relates to improvements in draft equalizers for cultivators.

The object of the present invention is to improve the construction of draft equalizers for cultivators, and to provide a simple, inexpensive and efficient draft device, designed principally for use on riding corn cultivators or plows, and capable of enabling the horses to be hitched close to a cultivator, and adapted should one horse pull ahead of the other to maintain an equal draft so that the horse in advance will not pull the cultivator sidewise.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a draft equalizer, constructed in accordance with this invention, and shown applied to a cultivator. Fig. 2 is a perspective view of the draft equalizer and the arch to which the same is secured. Fig. 3 is a plan view of the same. Fig. 4 is a detail sectional view on the line 4—4 of Fig. 1.

Like numerals of reference designate corresponding parts in all the figures of the drawing.

In the accompanying drawing in which is illustrated the preferred embodiment of the invention, the draft equalizer is shown mounted on the front arch 1 of a cultivator, the front end of the plow beams 2 being connected with terminal pivot portions of the arch at opposite sides thereof in the usual manner. In plows or cultivators not equipped with such an arch, the attachment may be secured to any other convenient portion of the cultivator. The draft equalizer consists of spaced upright rock shafts 3, mounted in upper and lower bearings 4 and 5 and located at opposite sides of the arch 1, and provided at their upper ends with forwardly extending horizontally disposed arms 6, connected by a transverse bar or link 7, which is located below the plane of the tongue or draft beam 8 of the cultivator. The arms 6 are provided at their outer ends with eyes or openings for the reception of bolts 9, which pass through eyes or openings in the ends of the transverse connecting bar or link 7.

The upper and lower bearings which project forwardly from the sides of the arch 1, are each composed of front and rear blocks 10 and 11, provided in their contiguous faces with bearing recesses 12, forming a bearing opening for the shaft 3, as clearly illustrated in Fig. 4 of the drawing. The rear block 11 is also provided with a recess 13, formed in the rear face of the block and receiving the side of the arch 1.

The front and rear blocks 10 and 11 are provided with registering perforations 14 and 15 through which pass the sides of a U bolt 16, which embraces the side of the arch and secures the sectional bearing to the same. The ends of the U bolt are threaded and receive nuts 17, which fit against the outer face of the front block 10. In order to prevent the upper and lower bearings from slipping on the sides of the arch, the rear block 11 of each bearing is provided at its recess 13 with a projecting stud 24, fitting in a recess or socket 25 in the side of the arch and held in engagement with the same by the U-shaped bolt 16. The rock shafts are provided with upper and lower collars or flanges 18 and 19, located, respectively, at the upper faces of the blocks of the upper bearing and at the lower faces of the lower bearing and coöperating with the said bearings to hold the rock shafts against vertical movement in either direction.

The spaced upright rock shafts which are located in advance of the side portions of the arch are provided at their lower ends with laterally extending horizontal arms 20, projecting in opposite directions and located in a plane above the terminal pivot portions of the arch 1 and provided at their outer ends with eyes 21 for the reception of links 22, which connect swingletrees 23 with the outer ends of the laterally extending arms 20. The vertical rock shafts are adapted to partially rotate in their bearings to permit the lower laterally extending swingletree carrying arms to swing backwardly and forwardly, and when one of the swingletree carrying arms moves forwardly, the other swings rearwardly a corresponding distance, motion being communicated from one rock shaft to the other through the transverse link or bar and the upper forwardly extending arms. The link permits all the play afforded by a doubletree and it enables the horses to be hitched close to a cultivator, which is an advantage in pulling, and it will enable one horse to pull in advance of the other without drawing the cultivator sidewise.

Having thus fully described my invention, what I claim as new and desire to secure by Letters Patent, is:—

1. The combination with a cultivator including a tongue and an arch, of upper and lower bearings mounted on the sides of the arch and projecting forwardly therefrom, spaced upright rock shafts journaled in the said bearings and located in advance of the sides of the arch and provided at their upper ends with forwardly extending longitudinally disposed arms located below the plane of the tongue, said rock shafts being also provided at their lower ends with transversely disposed arms located above the plane of the terminal pivot portions of the arch, a transverse bar located below the tongue and extending across the space between and pivotally connected with the upper arms of the rock shafts to cause the latter to move in unison, and swingletrees connected with the lower transversely disposed arms.

2. The combination with a plow or cultivator having an arch provided at opposite sides with sockets, of sectional bearings composed of front and rear blocks provided with bearing recesses, the rear block being also provided with a recess to receive the arch and having a stud to fit the socket of the same and interlocking the bearings with the sides of the arch, a U-shaped bolt connecting the front and rear blocks and embracing the arch and retaining the stud in the socket of the same, spaced upright rock shafts mounted in the bearing recesses of the sectional bearings and located in advance of the sides of the arch, means for connecting the rock shafts for causing the same to move in unison, and swingletrees connected with the rock shafts.

In testimony, that I claim the foregoing as my own, I have hereto affixed my signature in the presence of two witnesses.

CHARLES E. KING.

Witnesses:
J. C. PEERY,
H. E. LAUBENDER.

---

Copies of this patent may be obtained for five cents each, by addressing the "Commissioner of Patents. Washington, D. C."